(12) United States Patent
Beacken (10) Patent No.: US 7,764,882 B2
(45) Date of Patent: *Jul. 27, 2010

(54) OPTICAL PACKET TRAY ROUTER

(75) Inventor: Marc J. Beacken, Randolph Township, Morris County, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2197 days.

This patent is subject to a terminal disclaimer.

(21) Appl. No.: 10/306,935

(22) Filed: Nov. 29, 2002

(65) Prior Publication Data

US 2004/0105675 A1 Jun. 3, 2004

(51) Int. Cl.
*H04J 14/00* (2006.01)
(52) U.S. Cl. .................. 398/49; 398/45; 398/47; 398/48; 398/51; 398/53; 385/24; 385/16; 385/17; 385/18; 370/352; 370/389; 370/392; 370/395.31
(58) Field of Classification Search .............. 398/54, 398/45, 46, 47, 48, 49, 50, 51, 52, 53, 55, 398/56, 57, 59, 79, 83; 385/16, 122, 24, 385/17, 18; 370/352, 392, 389, 395.31
See application file for complete search history.

(56) References Cited

U.S. PATENT DOCUMENTS

| | | | | | |
|---|---|---|---|---|---|
| 5,018,130 | A * | 5/1991 | Suzuki et al. | ................ | 398/51 |
| 5,861,965 | A * | 1/1999 | Koren et al. | ................ | 398/75 |
| 6,327,283 | B1 * | 12/2001 | Hung | ................ | 372/23 |
| 6,421,179 | B1 * | 7/2002 | Gutin et al. | ................ | 359/572 |
| 6,519,062 | B1 * | 2/2003 | Yoo | ................ | 398/49 |
| 6,665,495 | B1 * | 12/2003 | Miles et al. | ................ | 398/54 |
| 6,768,827 | B2 * | 7/2004 | Yoo | ................ | 385/14 |
| 6,810,211 | B1 * | 10/2004 | Castanon | ................ | 398/47 |
| 6,934,472 | B2 * | 8/2005 | Chang et al. | ................ | 398/51 |
| 7,027,469 | B2 * | 4/2006 | Sidorin et al. | ................ | 372/20 |
| 7,106,967 | B2 * | 9/2006 | Handelman | ................ | 398/47 |
| 7,181,140 | B2 * | 2/2007 | Ovadia | ................ | 398/51 |
| 7,206,509 | B2 * | 4/2007 | Beacken | ................ | 398/53 |
| 2002/0048066 | A1 * | 4/2002 | Antoniades et al. | ................ | 359/128 |
| 2002/0191913 | A1 * | 12/2002 | Hocker et al. | ................ | 385/37 |
| 2004/0105620 | A1 * | 6/2004 | Beacken | ................ | 385/37 |
| 2004/0126057 | A1 * | 7/2004 | Yoo | ................ | 385/16 |
| 2004/0126072 | A1 * | 7/2004 | Hoon Lee et al. | ................ | 385/122 |

* cited by examiner

*Primary Examiner*—Hanh Phan
(74) *Attorney, Agent, or Firm*—Ryan, Mason & Lewis, LLP (57) ABSTRACT

An optical packet tray router is disclosed that manipulates a signal wavelength as the fundamental control mechanism. The disclosed optical packet tray router aggregates one or more packets in a packet tray for transmission over a network. The header information associated with each packet is used to route each packet to the appropriate destination channel and to make timing decisions. A wavelength server generates optical control wavelengths in response to the timing decisions. A generated optical control wavelength is used to adjust the wavelength of a given packet tray and thereby introduce a wavelength selective delay to the packet tray to align packet trays or to shift one or more packet trays to avoid a collision. The wavelength of the packet tray is converted to a control wavelength corresponding to an identified delay, irrespective of the initial channel upon which the packet tray was received. At the output stage of the packet tray router, the packet tray wavelength can be converted to any desired output channel wavelength.

42 Claims, 10 Drawing Sheets

OPTICAL PACKET TRAY ROUTER

CROSS-REFERENCE TO RELATED APPLICATIONS

The present application is related to U.S. patent application Ser. No. 10/306,934, entitled "Method and Apparatus for Temporally Shifting One or More Packets Using Wavelength Selective Delays," filed contemporaneously herewith and incorporated by reference herein.

FIELD OF THE INVENTION

The present invention relates to optical communication networks and, more particularly, to optical devices for routing multi-wavelength optical signals.

BACKGROUND OF THE INVENTION

Many innovations for optical communication systems have involved the manner in which light waves are switched and manipulated. In many optical transmission applications, it is necessary to perform one or more of the following actions on light: switching, wavelength conversion, attenuation, waveform amplification/reshaping/retiming (1R/2R/3R), routing to different locations or manipulating the phase or polarization of light. Such actions are critical for realization of the optical networks that are the foundation of global communications systems.

Optical communication systems increasingly employ wavelength division multiplexing (WDM) techniques to transmit multiple information signals on the same fiber, and differentiate each user sub-channel by modulating a unique wavelength of light. WDM techniques are being used to meet the increasing demands for improved speed and bandwidth in optical transmission applications. In optical communication networks, such as those employing WDM techniques, individual optical signals are often selectively routed to different destinations. Thus, a high capacity matrix or cross-connect switch is often employed to selectively route signals through interconnected nodes in a communication network.

At the heart of these cross-connect switches is the single switching unit. Electronic optical switches first convert an optical signal into an electrical signal to perform the switching and then convert the electrical signal back into optical signals. These conversions are very expensive and the switches are complex to manage but allow considerable flexibility. As networks grow and become dense, however, electronic switches become increasingly expensive and harder to fabricate.

Therefore, optical switches that operate directly on the light wave are favorable. Optical switches are often realized in optical waveguides that can be manufactured with low cost and enable easy multiplexing and de-multiplexing of the WDM signal using waveguide grating routers (WGR). For a detailed discussion of waveguide grating routers, such as those composed of optical star couplers and wavelength dependent beam forming, see U.S. Pat. No. 4,904,042 to Dragone.

Currently available optical switches, however, allocate an entire wavelength to each packet in order to permit wavelength selective routing. Wavelengths that can be exploited for optical communications are finite in number and expensive to provision. Thus, an entire wavelength is a rather large granularity for resource allocation in an optical communication system. A need therefore exists for a more efficient mechanism for switching optical signals at the wavelength level, especially at the core of an optical network. A further need exists for a scalable approach for implementing systems comprised of large number of optical flows, and a heterogeneous mix of ever increasing information rates upon each such flow.

SUMMARY OF THE INVENTION

Generally, an optical packet tray router is disclosed that manipulates signal wavelength as the fundamental control mechanism. The disclosed optical packet tray router aggregates one or more packets in a packet tray for transmission over a network. The packet trays provide a mechanism for switching at the wavelength level. The packet trays carry one or more packets through an optical communication system and represent the routable entity with a finer grain size than wavelength circuit switched systems, since each packet tray can be dynamically, in time and space, assigned a unique wavelength.

An exemplary N×N optical packet tray router employs wavelength division multiplexing techniques to transmit m information signals (i.e., packet trays) on the same physical channel. The optical tray router includes a control section and a data section. According to one aspect of the invention, the data section processes only optical signals. The disclosed optical tray router switches a packet tray received on one of N input channels to one of N appropriate output channels, with an appropriate wavelength, based on associated header information and routing protocol algorithm. The payload portion of all the packet trays in a given time slot are processed in parallel as optical signals. The header information associated with each packet tray, together with a routing algorithm and local system state information, are used to route each packet to the appropriate destination channel and to make timing decisions. The packet tray preamble is used to establish a timing reference for the physical input channel with respect to the local time reference associated with the optical packet tray router. In this manner, all wavelength division multiplexed packet tray streams are associated with a timing offset relative to the local optical packet tray router timing reference. The timing offsets are used to align the (wavelength and spatially demultiplexed) packet tray streams.

A disclosed wavelength server (also referred to as a lambda server) generates optical control wavelengths in response to the timing decisions. The wavelength server efficiently and dynamically generates the unique required continuous wave (CW) light, of an appropriate wavelength, that is used to direct control points within the optical data path. In the optical packet tray router, these continuous wave light sources establish the fundamental mechanism for controlling elements within the optical packet tray router. By realization of the wavelength server in a centralized and scalable disclosed method, distribution of numerous and complex electrical control signals are avoided in the OPTR.

A generated optical control wavelength is used to adjust the wavelength of a given packet tray and thereby introduce a wavelength selective delay to the packet tray. Wavelength selective delays can be employed to align packet trays or to shift one or more packet trays to avoid a collision within the switch fabric. According to one aspect of the invention, each packet tray in a given time slot is time aligned to a master clock start of packet tray reference using a tunable optical delay. The tunable optical delay allows a given packet tray to be shifted in time using a coarse or a fine time adjustment (or both). A wavelength selective coarse delay adjustment is achieved using a multi-wavelength Bragg grating that shifts a packet tray based on the optical control wavelength assigned to the packet tray. A wavelength selective fine delay adjustment is achieved using a dispersive medium where the transmission time through the dispersive medium is a function of the optical control wavelength assigned to the packet tray. Each distinct optical control wavelength introduces a different delay through the coarse and fine delay elements.

According to one aspect of the invention, a k-deep random access write buffer introduces a wavelength selective delay that ensures that two packet trays are not going to the same output channel at the same time, using the known destination information thus avoiding a packet tray collision. The k-deep random access write buffer will time temporally shift a packet tray by up to k time slots, where each time slot has a duration approximately equal to a packet tray interval. The exemplary k-deep random access write buffer includes k coarse delay elements, such as multi-wavelength Bragg gratings, each separated by a corresponding fixed delay element.

Once a header processor identifies a delay to be assigned to a given packet tray at a given stage in the packet tray router, the wavelength of the packet tray is converted to the control wavelength corresponding to the identified delay, irrespective of the initial wavelength of the packet tray or the initial channel upon which the packet tray was received at the packet tray router. At the output stage of the packet tray router, the packet tray wavelength can be converted to any desired output channel wavelength.

The disclosed optical packet tray router architecture may be viewed as a pipelined, staged architecture. Each stage is implemented in two steps. In a first step, each stage in the switch architecture typically receives two inputs. One input is from the prior switch stage output, and the other input is the continuous wave wavelength provided by the wavelength server as appropriate. The two inputs are combined to provide signal restoration, (e.g., amplification, shaping and possibly retiming) as well as wavelength conversion, all in the optical domain. In a second step, the restored and recolored signal is then presented to the passive optical elements that implement the desired function for that architecture stage. The overall switch architecture is instantiated by a cascade of such stages. The wavelength grid internal to the switch is engineered separately from the external optical interfaces. The external interface wavelengths typically need to conform to an industry standard defined WDM grid structure, such as the wavelength grid structure established by the ITU.

A more complete understanding of the present invention, as well as further features and advantages of the present invention, will be obtained by reference to the following detailed description and drawings.

DETAILED DESCRIPTION

Figure 1:
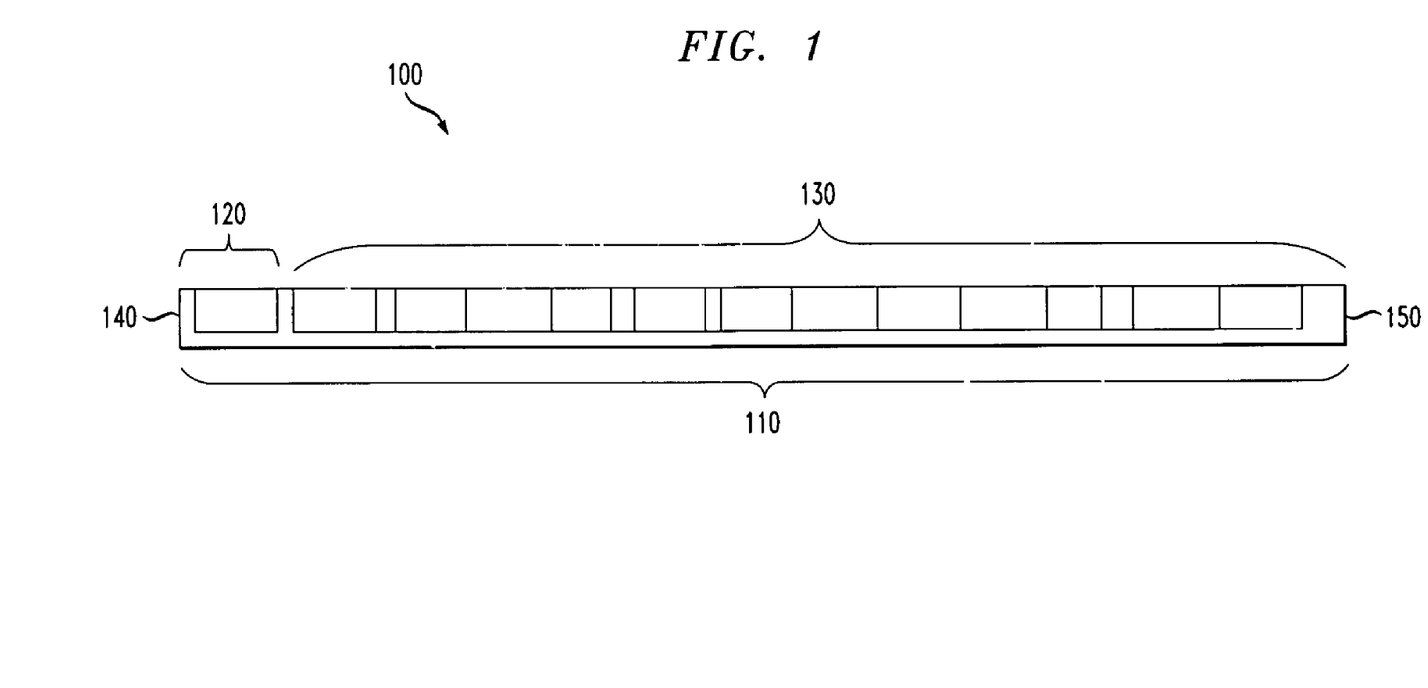
FIG. 1 illustrates a packet tray incorporating features of the present invention.

The present invention provides an optical communication system that aggregates one or more packets in a packet tray 100, with constituent parts shown in FIG. 1, for transmission over a network. The present invention recognizes that wavelengths are finite in number and expensive to provision. Thus, an entire wavelength is a rather large granularity for resource allocation in an optical communication system. The packet trays 100 of the present invention provide a mechanism for switching at the wavelength level. The packet trays 100 carry one or more packets through an optical communication system and represent the routable entity with a finer grain size, since each tray can be assigned a unique wavelength.

Figure 2:
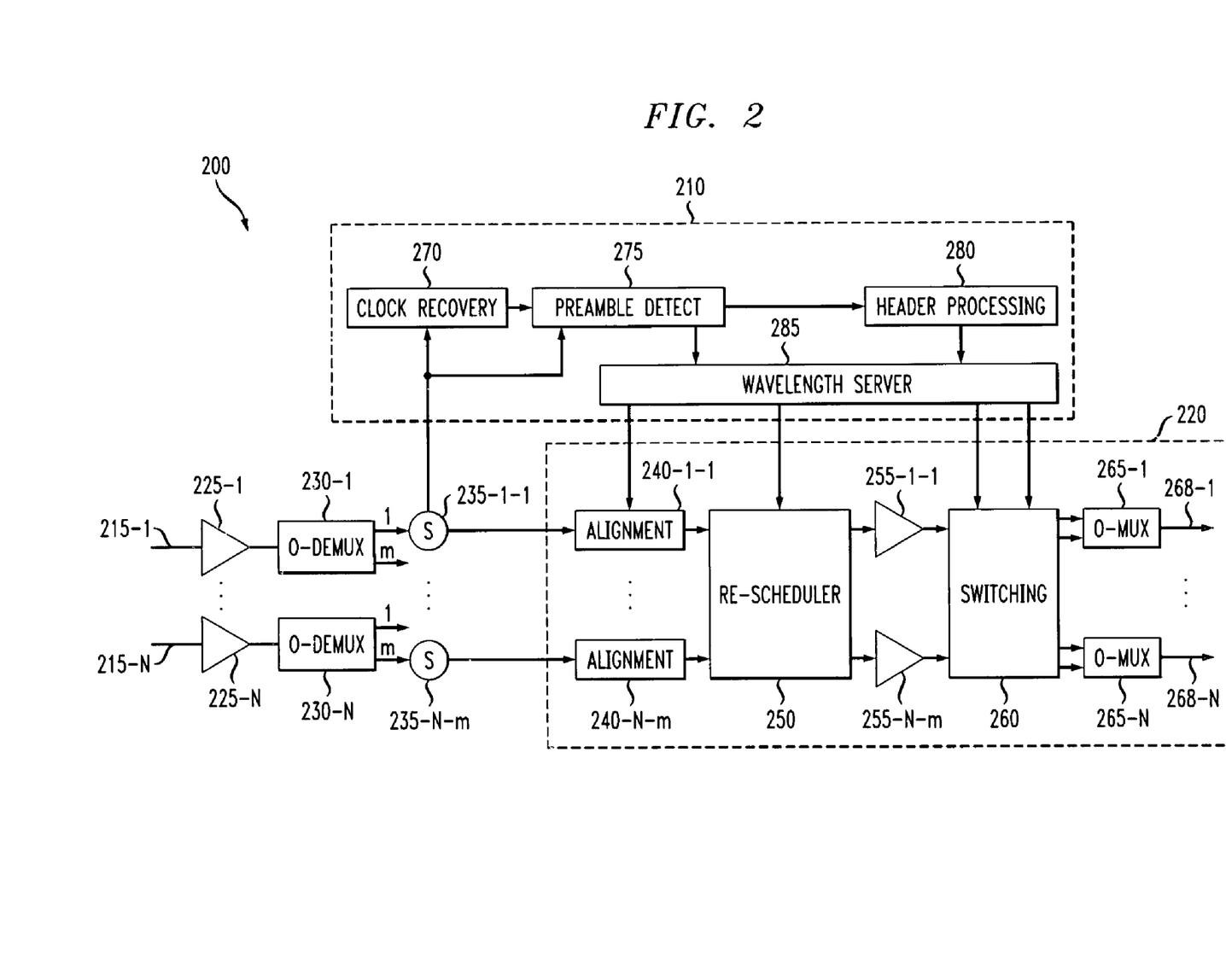
FIG. 2 is a schematic block diagram of an N×N optical tray router in accordance with the present invention.

A router or switch in accordance with the present invention, such as the optical tray router (OPTR) 200, discussed below in conjunction with FIG. 2, provides space and wavelength selection in order to route each packet tray 100 to the appropriate destination. The disclosed optical tray router 200 provides space selection by switching a packet tray 100 received on one of N input channels to an appropriate output channel based on the associated header information. The optical tray router 200 provides wavelength selection using wavelength division multiplexing techniques to transmit m information signals (packet trays 100) on the same channel.

According to one aspect of the invention, a router or switch in accordance with the present invention, such as the optical tray router 200 of FIG. 2, provides an optical data path, such that only optical signals are processed, and conversion between optical and electrical signals is not required. In order to maintain an optical signal of sufficient intensity at each stage of an optical communication system, the present invention provides a system for restoring the optical signals using a wavelength server 285, discussed below in conjunction with FIGS. 2, 11 and 12. As discussed further below, the wavelength server 285 generates lights of desired wavelengths in order to restore the optical signals.

According to another aspect of the invention, a number of techniques are disclosed for introducing a wavelength selective delay. For example, each of the packet trays in a given time slot are time aligned using a tunable optical delay. The tunable optical delay allows a given packet tray to be shifted in time using a coarse or a fine time adjustment (or both). In addition, wavelength selective delays are employed by the present invention to ensure that two packet trays are not going to the same output channel at the same time, using the known destination information.

FIG. 1 illustrates an exemplary packet tray 100 in accordance with the present invention. As shown in FIG. 1, a packet tray 100 is typically of a fixed length 110, comprised of a tray header 120 and a payload 130. In operation, the optical tray router 200 incorporates the following features. Each physical input channel is wavelength demultiplexed to separate the streams of packet trays. The packet tray preamble is used to establish a timing reference for the physical input channel with respect to the local time reference associated with the optical tray router 200. (The local time reference may or may not be slaved to a global network time.) This timing reference is tracked to maintain the "beginning of packet tray" time reference for a given physical channel. Resynchronization of the physical channel will be required if the source network node or an intervening cross-connect re-establishes the physical connection. It is during this procedure that the packet tray header clock rate synchronization and lock is established through burst mode timing recovery methods. The header information 120 is extracted from each packet tray 100. The header and payload clocks and clock rates need not be the same. In this manner, all wavelength division multiplexed-packet tray streams associated each and every input physical channel are associated with a timing offset relative to the local optical tray router timing reference. The timing offsets are used to align the (wavelength and spatially demultiplexed) packet tray streams. In general, all packet trays need not be of identical maximum length. However, it is assumed that the maximum length is chosen to insure efficient utilization of trays and effective service to the payload packets. Hence, the scheduling epoch and granularity is that associated with the packet tray itself. Alignment of the trays enables the establishment of a time slotted switch element resource allocation method.

Since only the packet tray header information is interpreted by the optical tray router 200, the form and rate of the payload information (e.g., the "packets") is unconstrained and effectively transparent to the optical tray router 200. This provides a highly scalable routing and switching architecture adapting transparently to diverse payload data rates and formats. The header information rate may be established to establish ease of processing implementation while ensuring efficient use of network resources. In general, the header duration should be short with respect to the packet tray payload interval. In addition, time alignment for the header portion of the packet tray format and the payload portion of the packet tray format will be established within some uncertainty interval. This interval is incorporated into the OPTR packet format and may be engineered to minimize the impact on overall system performance. The header information 120 is processed using a routing algorithm together with a representation of the local switch resource state to yield control and timing decisions that direct the overall switch architecture operation. The establishment of timing offset, header decoding and header processing may be performed in an all optical manner, an all electronic manner or using a hybrid approach.

The tray header 120 shown in FIG. 1 is typically of a fixed length and includes the source/destination or virtual packet tray identifier that will be used together with routing information and optical tray router internal state information within the header processing 280 (FIG. 2) to determine the appropriate paths and delays through the switch for steering the packet tray 100. The payload 130 is comprised of one or more packets that may optionally be of variable size. In addition, the exemplary packet tray 100 includes tray delimit flags 140, 150 indicating the start and end of a packet tray 100, respectively.

Generally, the tray header 120 should be small relative to the size of the payload 130. In order to maintain a tray transport efficiency of 95%, for example a packet tray could be characterized by a payload transmission rate of 10 GHz, a tray header 120 duration of 100 nS and a payload 130 should contain 2.5 Kilobytes. The parameters shown yield viable implementation and performance characteristics such as throughput efficiency and reasonable latencies. Implementation considerations include viability of implementing delay structures, control processing intervals, and control set up times. Many other parameter sets yield acceptable implementations. The following table specifies a number of parameters for the optical tray router 200 for a number of efficiency levels:

| Structural/ Efficiency 98% | payload size bytes | 250 kB | 25 kB | 62.5 KB | 6.25 KB |
|---|---|---|---|---|---|
| Data Clock Rate | bps | 4.00E+10 | 4.00E+10 | 1.00E+10 | 1.00E+10 |
| packet tray duration | seconds | 5.22E−05 | 5.22E−06 | 5.22E−05 | 5.22E−06 |
| header equiv bits w/ framing | bits | 40000 | 4000 | 10000 | 1000 |
| header time | seconds | 1.00E−06 | 1.00E−07 | 1.00E−06 | 1.00E−07 |
| packet payload time | seconds | 5.12E−05 | 5.12E−06 | 5.12E−05 | 5.12E−06 |
| efficiency = Payload/ Tot Duration | percentage | 98% | 98% | 98% | 98% |
| Structural Efficiency 95% | payload size bytes | 100 kB | 10 kB | 25 kB | 2.5 kB |
| Data Clock Rate | bps | 4.00E+10 | 4.00E+10 | 1.00E +10 | 1.00E+10 |
| packet tray duration | seconds | 2.15E−05 | 2.15E−06 | 2.15E−05 | 2.15E−06 |
| header equiv bits w/ framing | bits | 40000 | 4000 | 10000 | 1000 |
| header time | seconds | 1.00E−06 | 1.00E−07 | 1.00E−06 | 1.00E−07 |
| packet payload time | seconds | 2.05E−05 | 2.05E−06 | 2.05E−05 | 2.05E−06 |
| efficiency = Payload/ TotDuration | percentage | 95% | 95% | 95% | 95% |
| Structural Efficiency 91% | payload size bytes | 50 kB | 5 kB | 12.5 kB | 1.25 kB |
| Data Clock Rate | bps | 4.00E+10 | 4.00E+10 | 1.00E+10 | 1.00E+10 |
| packet tray duration | seconds | 1.12E−05 | 1.12E−06 | 1.12E−05 | 1.12E−06 |
| header equiv bits w/ framing | bits | 40000 | 4000 | 10000 | 1000 |
| header time | seconds | 1.00E−06 | 1.00E−07 | 1.00E−06 | 1.00E−07 |
| packet payload time | seconds | 1.02E−05 | 1.02E−06 | 1.02E−05 | 1.02E−06 |
| efficiency = Payload/ TotDuration | percentage | 91% | 91% | 91% | 91% |

FIG. 2 is a schematic block diagram of an N×N optical tray router 200 in accordance with the present invention. The optical tray router 200 employs wavelength division multiplexing techniques to transmit m information signals (packet trays 100) on the same channel. As shown in FIG. 2, the optical tray router 200 includes a control section 210 and a data section 220. The data section 220 processes only optical signals in accordance with the present invention, and the control section 210 may process optical signals or electrical signals (or both). The disclosed optical tray router 200 switches a packet tray 100 received on one of N input channels 215-1 through 215-N to one of N appropriate output channels 268-1 through 268-N based on the associated header information 120.

As shown in FIG. 2, the optical tray router 200 includes N input channels 215-1 through 215-N, each having an associated optical amplifier 225-1 through 225-N. Thereafter, each of the N input channels are demultiplexed to separate the m packet trays 100 using a corresponding optical demumultiplexer 230-1 through 230-N. Thereafter, the N×m packet trays 100 are processed in parallel as optical signals in the optical tray router 200. There is an optical splitter 235-$i$-$j$ and an alignment stage 240-$i$-$j$ associated with each of the N×m packet trays 100.

The optical splitters 235-$i$-$j$ allocate a portion of the optical energy for processing by the control section 210. The control section 210 recovers the clock and monitors the incoming data until a tray delimit flag 140 is detected indicating the start of a new packet tray 100. It is noted that while the header information is distinct for each splitter 235-$i$-$j$, it is possible, depending on the overall network architecture that all m demultiplex outputs from a physical optical channel share common timing information. This attribute may be exploited to reduce complexity in clock recovery and preamble detect processing. Thereafter, the header information 120 is analyzed with respect to stored network routing information to determine the appropriate output channel 268 to route the packet tray to the header indicated destination or virtual packet tray identifier if cut through routing techniques are utilized. As discussed below in conjunction with FIG. 4, a fixed architectural delay is introduced subsequent to each splitter 235 to mask the delay caused by the header processing and to keep the appropriate header information aligned with the corresponding data. It is noted that after the splitters 235 copy the packet tray header information for use by the control processing section 210, the header portion 120 of the packet tray 100 may be reused for other purposes. One such purpose is to provide a required control setup interval for each switching stage.

The optical splitters 235-$i$-$j$ allocate most of the optical energy for processing by the data section 220. As shown in FIG. 2 and discussed further below in conjunction with FIGS. 5 and 6, the data section 220 includes an alignment stage 240-$i$-$j$ associated with each of the N×m packet trays 100. Generally, each alignment stage 240-$i$-$j$ aligns the start of the corresponding packet tray 100, using tray delimiter information from the control section 210 and tunable optical delays in accordance with the present invention.

The aligned packet trays 100 are then processed by a re-scheduler 250, discussed below in conjunction with FIGS. 7 and 8. The re-scheduler 250 ensures that two packet trays 100 are not going to the same output channel at the same time, using routing information received from the control section 210. Generally, in the event that two packet trays 100 are going to the same output channel at the same time, the re-scheduler 250 delays at least one packet tray until another time interval. The depth of available packet delays are chosen to limit the probability of a dropped packet to an arbitrary OPTR architecture design value based upon the ingress traffic characteristics.

The N×m optical packet trays 100 are restored, wavelength converted, and amplified by an associated optical device 255-1-1 through 255-N-m and then switched to the appropriate output channel by a switching stage 260, based on control information received from the control section 210. Example optical devices used for signal restoration, retiming, gain and wavelength conversion include: Mach Zehnder interferometers with semiconductor optical amplifiers (SOAs), delay interferometers with SOAs and non-linear optical waveguide techniques based upon multiple wave mixing. The switching stage 260 may be embodied, for example, using the switch fabric scaling techniques described in, e.g., Charles Clos "A Study of Non-Blocking Switching Networks," Bell System Technical Journal, Vol. XXXII, 406-24, (March, 1953); or Chuan-Lin Wu and Tse-Yun Feng, "Tutorial: Interconnection Networks for Parallel Processing," IEEE Computer Society ISBN 0-8186-0573-X, 127-44, (1994), each incorporated by reference herein. The optical equivalent of the switching element building block of these interconnected structures, in keeping with the OPTR architectural principles, includes an active wavelength conversion stage with the appropriate optical control signals from the Lambda Server, followed by a passive optical WGR. These switch building blocks are then interconnected in analogous manners to multi-stage interconnection schemes, such as the Clos topology referenced above.

Figure 3:
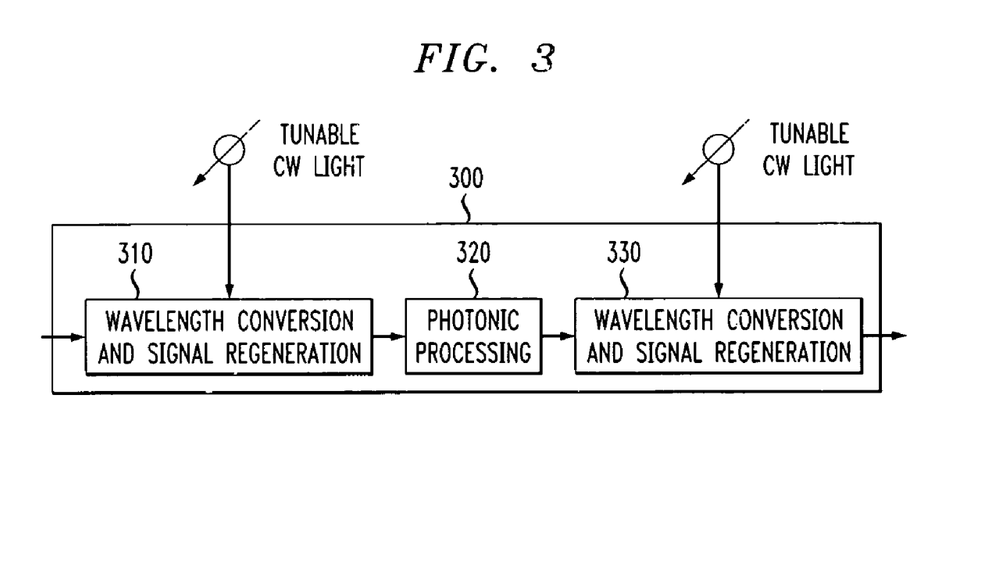
FIG. 3 illustrates a schematic block diagram of a signal level restoration/regeneration element incorporating features of the present invention.

Implicit in the output WDM stage in FIG. 2, 265-1 through 265-N is a restoration/regeneration/wavelength conversion stage to ensure proper processing in the subsequent wavelength multiplexing operation. FIG. 3 depicts this signal conditioning function. In addition, this stage represents the last opportunity to "re-write" the header information required to create a well-formed packet tray using techniques depicted in FIG. 10. The header processing creates the new outbound header and provides it in an optical form to the signal conditioning function associated with the output multiplexers 265. It may be merged into the outbound stream at the appropriate wavelength. Note that this header re-write function may also be accomplished in earlier stages of the optical tray router 200, depending upon implementation trades.

The m optical packet trays 100 associated with each of the N output channels are then multiplexed onto the corresponding fiber using optical multiplexers 265-1 through 265-N. The optical multiplexers 265, as well as the optical demultiplexers 230, may be embodied, for example, as waveguide grating routers (WGR), such as the optical star couplers described in U.S. Pat. No. 4,904,042 to Dragone, incorporated by reference herein.

FIG. 3 illustrates a schematic block diagram of a signal level restoration/regeneration/wavelength conversion element 300, incorporating features of the present invention. As shown in FIG. 3, the signal level restoration/regeneration/wavelength conversion element 300 initially restores an input optical signal at stage 310 by converting the wavelength to the appropriate wavelength for the current packet tray 100 and regenerating the signal level and waveform (and removing any dispersion), using a tunable continuous wave light received from the wavelength server 285, discussed further below. Thereafter, photonic processing is performed on the optical signal at stage 320, such as switching, alignment, multiplexing or delay. Following the photonic processing, the optical signal is again restored at stage 330 by converting the wavelength to the appropriate wavelength for the current packet tray 100 and regenerating the signal level, using a tunable continuous wave light received from the wavelength server 285. These restoration/regeneration/wavelength conversion stages may be placed as necessary in the multi stage optical tray router architecture to maintain signal fidelity and ensure wavelength conversion for subsequent stage processing. All required such stages are not explicitly shown in FIG. 2. In addition, the header re-write function may also be incorporated, as discussed further below in conjunction with FIG. 10, in this stage.

The wavelength conversion and signal restoration at stages 310 and 330 may be performed, for example, by Mach Zehnder interferometers, such as those described in Katsunari Okamoto, "Fundamentals of Optical Waveguides," 159, Academic Press (2000), incorporated by reference herein. As previously indicated, the optical tray routers 200 of the present invention have N input channels, each containing m WDM multiplexed wavelength channels. If there are p required restoration stages, then the number of required restoration elements 300 grows as N×m×p.

Header Processing Delay

Figure 4:
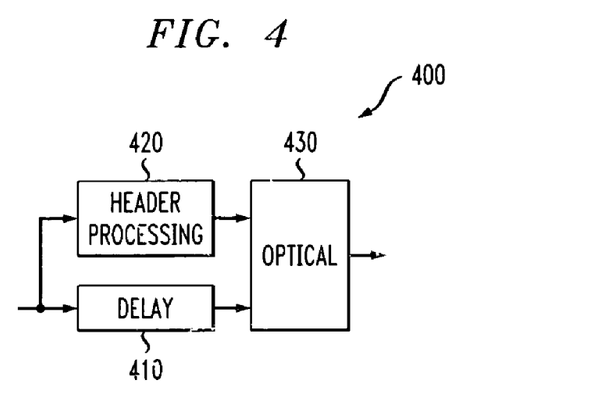
FIG. 4 is a schematic block diagram of an optical router illustrating a fixed delay that is introduced to mask the time required to process the tray header.

FIG. 4 is a schematic block diagram of an optical router 400 illustrating a fixed delay 410 that is introduced to mask the time required to process the tray header 120. The header processing section 420 of FIG. 4 corresponds to the control section 210 of FIG. 2 and the optical section 430 of FIG. 4 corresponds to the data section 220 of FIG. 2. Thus, the optical tray router 200 of FIG. 2 would introduce a delay after the splitter stage 235 in order to keep the data aligned with the corresponding header information. The header interval in each packet tray 100 provides a setup time for optical elements. This interval should be as small as possible to minimize the packet tray size, and hence the delay line length in the random access buffer portion of the architecture (although the header interval must be large enough to carry label information used for routing such as source/destination addresses or virtual packet tray identifiers for cut through routing techniques).

The delay introduced by the delay 410 provides a latency impact on system performance. While the delay affects the length of the front end delay line, it is unrelated to tray sizing with respect to efficiency. Minimizing this duration helps to simplify the delay line implementation.

Optical Alignment Delays

Figure 5:
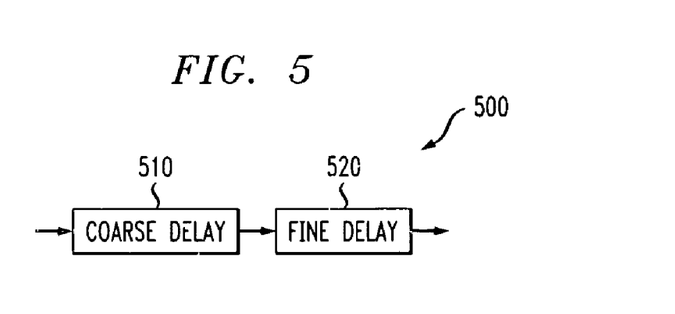
FIG. 5 is a schematic block diagram illustrating a delay scheme used by the alignment stage of FIG. 2 to align each of the N×m packet trays.

FIG. 5 is a schematic block diagram illustrating a delay scheme 500 used by the alignment stage 240 to align each of the N×m packet trays 100 in the optical tray router 200. As shown in FIG. 5, each packet tray 100 can be aligned using a variable coarse delay 510 or a variable fine delay 520 (or both). This particular arrangement enables the realization of delays over a wide range of delay values.

Figure 6:
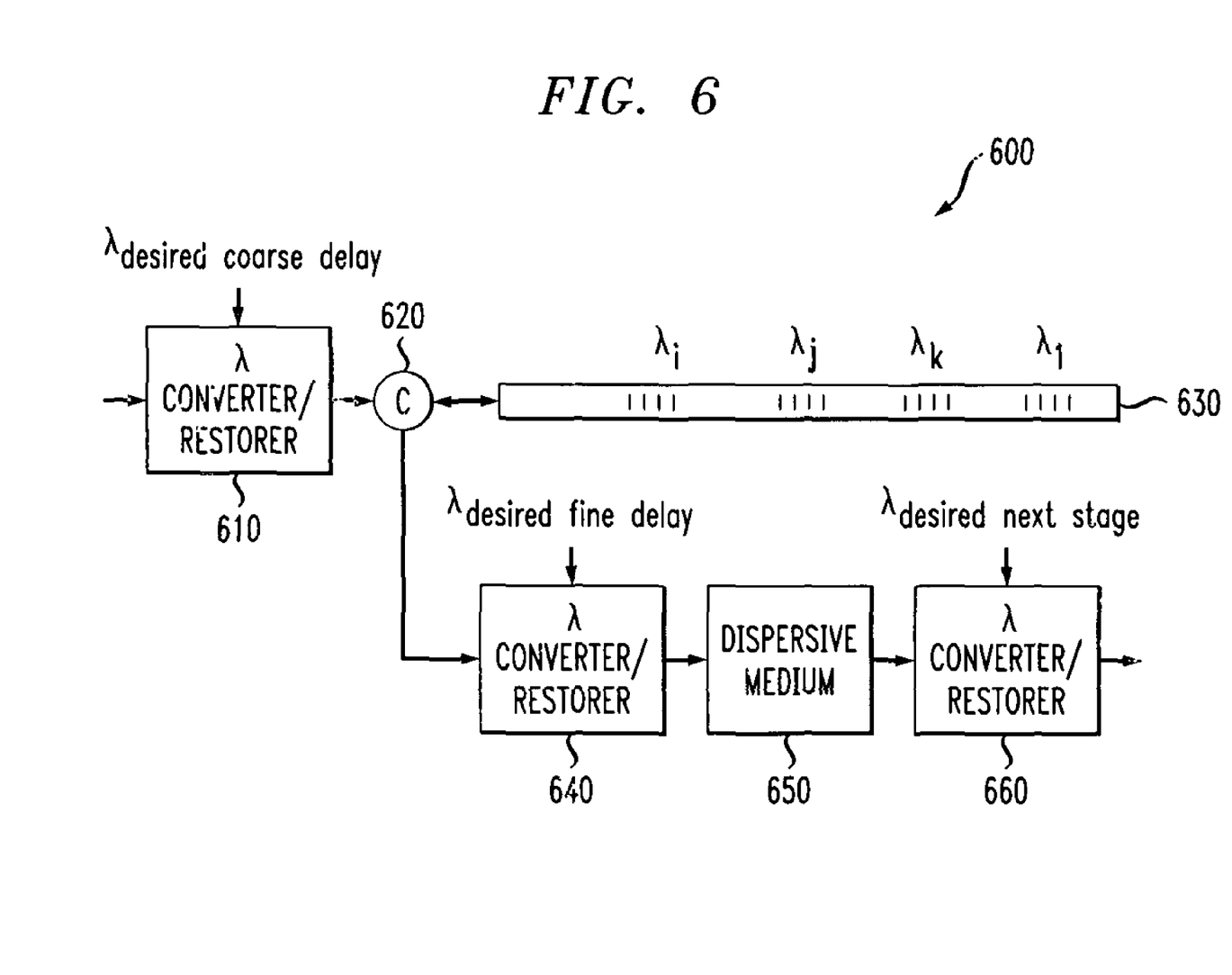
FIG. 6 is a schematic block diagram illustrating a particular implementation of the delay scheme of FIG. 5.

FIG. 6 is a schematic block diagram illustrating a particular implementation of the delay scheme 500 of FIG. 5. As shown in FIG. 6, a packet tray 100 of a given wavelength has its wavelength converted and restored by a wavelength converter/restorer 610 to a new wavelength, $\lambda_{desired\ coarse\ delay}$, having a corresponding coarse delay amount. The packet tray 100 then passes through an optical circulator 620 into a multi-wavelength Bragg grating 630. For a more detailed discussion of Bragg gratings, see, for example, Raman Kashyap, Fiber Bragg Gratings, Academic Press, Section 6.5, Optical Circulator Based OADM, 265-70 (ISBN 0-12-400560-8), incorporated by reference herein. Using the coarse/fine approach, this arrangement enables implementation of delays over a wide range of delay values while reducing the performance requirements on each constituent component of the scheme.

Generally, a Bragg grating is a fiber or wave guide etched with lines such that light of a given wavelength will be reflected in a certain region of the waveguide. For example, if light of a wavelength, $\lambda_k$, enters the Bragg grating, the light will be reflected in the third region identified in the example of FIG. 6. Each wavelength region in the Bragg grating will introduce a corresponding delay based upon the length of integrated waveguide or fiber between gratings and upon the round trip time of the light. For example, the exemplary Bragg grating 630 may permit a coarse delay of, e.g., 5, 10, 15 or 0.20 μsec to be selectively introduced for wavelengths, $\lambda_i$, $\lambda_j$, $\lambda_k$, or $\lambda_l$, respectively. Thus, the wavelength converter 610 is configured to adjust the wavelength of a packet tray 100 to a new wavelength, $\lambda_{desired\ coarse\ delay}$, selected from the group of wavelengths, $\lambda_i$, $\lambda_j$, $\lambda_k$, or $\lambda_l$.

Following reflection in the Bragg grating 630, the packet tray 100 having a wavelength, $\lambda_{desired\ coarse\ delay}$, will pass through the output port of the optical circulator 620 to a second wavelength converter/restorer 640 that converts the wavelength of the packet tray 100 to a new wavelength, $\lambda_{desired\ fine\ delay}$, having a corresponding fine delay amount. The fine delay amount may be, e.g., on the order of 0-5 micro-seconds.

The packet tray 100, now having a wavelength, $\lambda_{desired\ fine\ delay}$, is then applied to a dispersive medium 650, where the transmission time through the media 650 is a function of wavelength. In this manner, the wavelength, $\lambda_{desired\ fine\ delay}$, of the packet tray 100 can be selected to introduce a desired vernier delay, as described in J. P. Lang et al., "The λ-Scheduler: A Multiwavelength Scheduling Switch," J. on Lightwave Technology, Vol, 18, No. 8, (August 2000), incorporated by reference herein. The delayed packet tray 100, having a wavelength, $\lambda_{desired\ fine\ delay}$, is then applied to a third wavelength converter 660 that converts the wavelength of the packet tray 100 to a new wavelength, $\lambda_{desired\ next\ stage}$, having a wavelength that is appropriate for the next stage. In the optical tray router 200, the next stage after the alignment stage 240 is the re-scheduler 250, discussed below in conjunction with FIGS. 7 and 8.

The following paragraph discusses the control of desired coarse and fine delay wavelength generation. For each packet tray 100, the control path 210, using clock recovery and preamble detect information, analyzes the extent to which the tray 100 deviates from a OPTR master clock start of packet tray reference and determines the appropriate delay amount. The wavelength server 285 is commanded to deliver, by the control path 210, the appropriate light sources $\lambda_{desired\ coarse\ delay}$ and $\lambda_{desired\ fine\ delay}$ to the alignment stage 240-$i$-$j$ that is processing the corresponding packet trays 100. If the physical network (fiber) configuration and the predecessor OPTR node is operating under nominal conditions, once the initial alignment is set, further adjustments to the packet tray alignment are of an incremental, or tracking, nature. However, architectural support of rapid re-alignment improves OPTR robustness in the face of rapid and often network reconfigurations.

The wavelength converters/restorers 610, 640, 660 may be embodied using the same technology as discussed above in conjunction with FIG. 3 to restore an input optical signal by converting the wavelength to the appropriate wavelength and regenerating the signal level (and removing any dispersion). For example, the wavelength converters/restorers 610, 640, 660 may be embodied as Mach Zehnder interferometers using semiconductor optical amplifiers with interferometers (SOA-I), delay loop interferometers, non-linear optical pumping effects, or any other equivalent mechanism.

Packet Tray Re-scheduler

As previously indicated, the aligned packet trays 100 are processed by a re-scheduler 250 to ensure that two packet trays 100 are not going to the same output channel at the same time, using routing information received from the control section 210. Generally, in the event that two packet trays 100 are going to the same output channel at the same time, the re-scheduler 250 delays at least one packet tray until another time interval. (As discussed previously, the depth of the rescheduling buffer may be engineered for a particular probability of "packet-drop" for given traffic models.) The re-scheduler 250 may be embodied as a k-deep random access write buffer 700, shown in FIG. 7, incorporating features of the present invention. Generally, the k-deep random access write buffer 700 will time shift (delay) a packet tray 100 by up to k time slots, where each time slot has a duration equal to a packet tray interval. As shown in FIG. 7, the exemplary k-deep random access write buffer 700 includes k coarse delay elements 720-$i$ through 720-$k$, such as multi-wavelength Bragg gratings 630 (FIG. 6), each separated by a corresponding fixed delay element 730-$i$ through 730-$k$. The fixed delay elements 730 may be embodied, for example, as a wound fiber loop or an integrated waveguide leveraging Silicon optical bench (SiOB) techniques. (It is also noted that these delay elements provide an opportunity for incorporating optical gain through waveguide/fiber doping and optical pumping, if needed, for signal level equalization within the delay elements themselves.)

The total delay through a coarse delay element 720 and a corresponding fixed delay associated with the Bragg element 730 should be equal to a packet tray interval. The delay through the coarse delay element 720 will be small.) Thus, if a packet tray is reflected in the first stage, 720-$i$, then essentially no delay is introduced to the packet tray 100 (and the tray 100 is not time shifted). The stage that reflects a given packet tray is determined by the wavelength, $\lambda_{desired\ buffer\ delay}$, of the packet tray following conversion by the converter/restorer 710, in the manner described above in conjunction with FIG. 6.

If the control processing path 210 determines that a given packet tray 100 needs to be shifted by one or more time intervals to avoid a collision, the wavelength server 285 delivers the appropriate light source, $\lambda_{desired\ buffer\ delay}$, for the packet tray 100 to the re-scheduler 250. If a packet tray is reflected in the second stage, 720-$j$, for example, then a delay of one packet tray interval is introduced to the packet tray 100. Generally, if a packet tray is reflected in the k-th stage, 720-$k$, then a delay of k packet tray intervals is introduced to the packet tray 100.

Once reflected, the packet tray 100 is summed at stage 760 with all other packet trays, which relies on the fact that only one tray will be present at a given time (thus, implying N×m summers). Thus, each of the N×m packet trays can be selectively time shifted by up to k time slots, using an array of the k-deep random access write buffers 700. Thereafter, the wavelength of the packet tray 100 is converted at conversion stage 770 to a new wavelength, $\lambda_{desired\ next\ stage}$, having a wavelength that is appropriate for the next stage. In the optical tray router 200, the next stage after the re-scheduler 250 is the switching stage 260. The preparatory signal restoration/gain/wavelength conversion is shown on the system architecture diagram, FIG. 2, 255. This function is equivalent to the blocks shown in FIG. 7, items 770 and 780. The desired wavelength is a function of the next stage operation and is described in the Switching 260 section.

Figure 7:
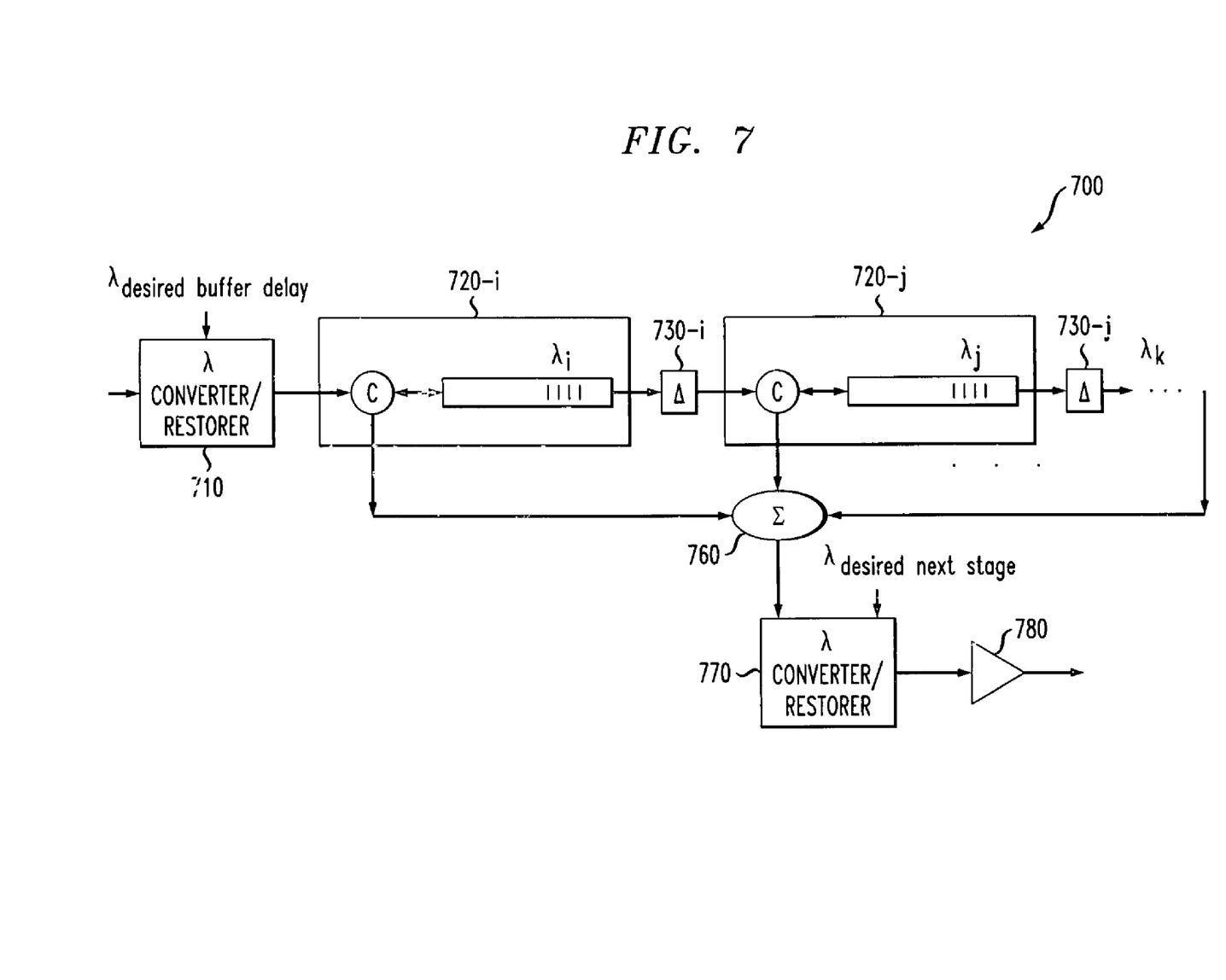
FIG. 7 is a schematic block diagram illustrating a k-deep random access write buffer used by the rescheduler of FIG. 2.
Figure 8:
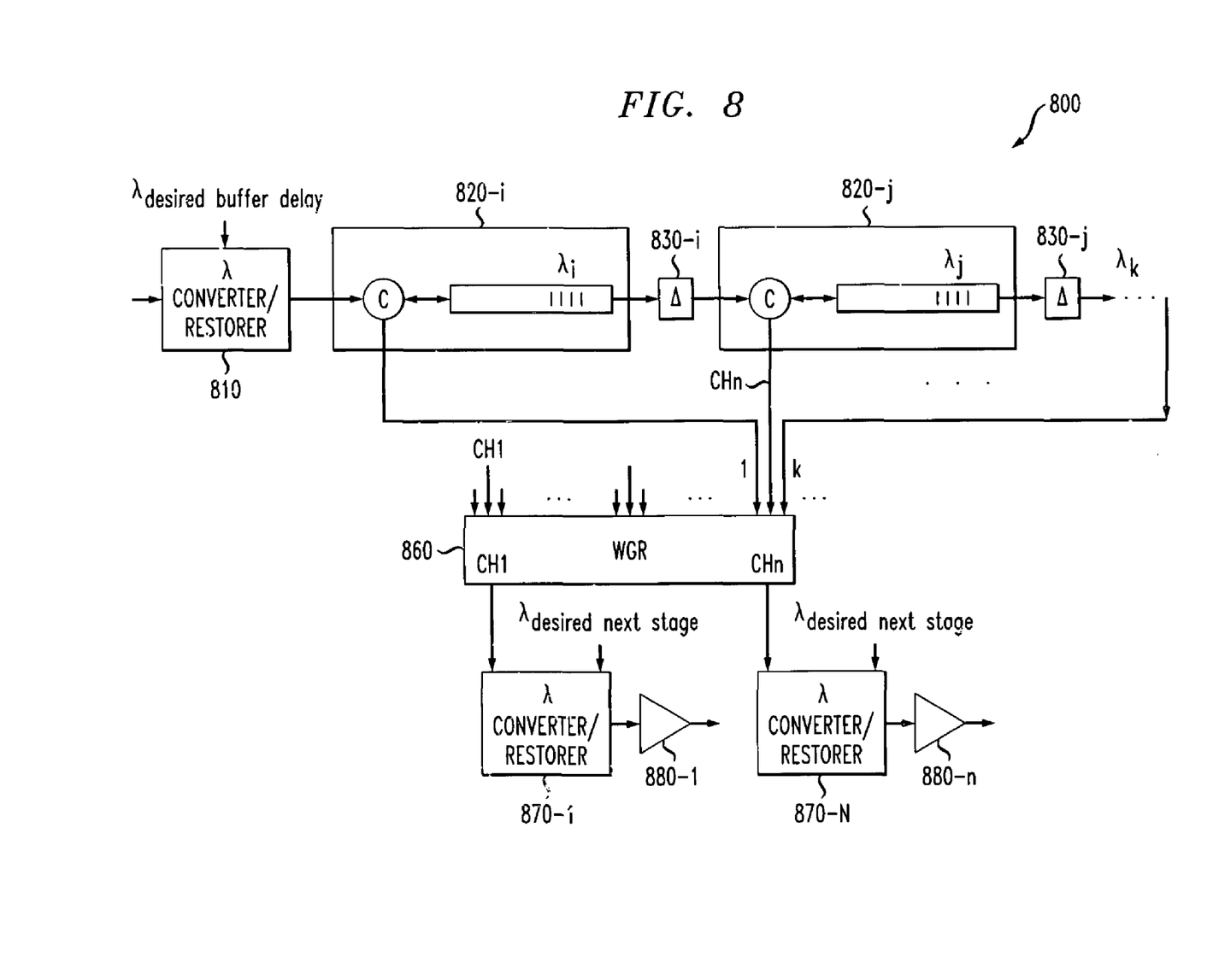
FIG. 8 is a schematic block diagram illustrating an alternate k-deep random access write buffer used by the rescheduler of FIG. 2.

FIG. 8 illustrates an alternate implementation of the k-deep random access write buffers 700 of FIG. 7, where the N×m summers 760 have been replaced by a fewer number of waveguide grating routers (WGR) 860. The chain of k coarse delay elements 820 and corresponding fixed delay elements 830 may be embodied in the same manner as described above in conjunction with FIG. 7. Rather than having N×m summers 760, however, the alternate k-deep random access write buffer 800 includes a smaller number of waveguide grating router (WGR) 860. The WGR 860 receives k signals for each of the n input channels. Only one of the k signals for each of the n number of WGR input channels will be active in a given time slot. The WGR 860 integrates the k signals for each of the n input channels and provides a corresponding output for each of the n number of WGR output channels utilized. The maximum port size of the WGR dictates the reduction in summer complexity achieved. Hence, if the number of channels that could be processed by a single WGR, is "W", then the number of WGRs required scales as (N×m)/W. The number of channels that may be processed by each WGR with a given port dimension is a function of buffer depth "k".

Thus, each of the N×m packet trays can be selectively time shifted by up to k time slots. Thereafter, the wavelength of each packet tray 100 is restored, amplified and converted at conversion stage 870-$i$ and 880-$i$ to a new wavelength, $\lambda_{desired\ next\ stage}$, having a wavelength that is appropriate for the next (switching) stage.

Figure 9A:
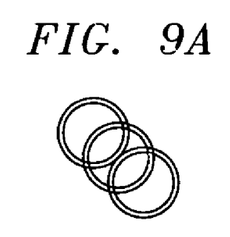
FIGS. 9A through 9G illustrate various implementations using Silicon optical bench (SiOB) techniques to implement the fixed delay elements of FIGS. 7 and 8.
Figure 9B:
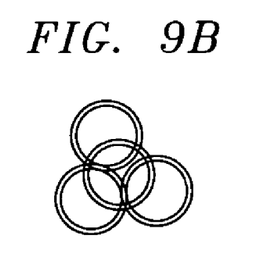
Figure 9C:
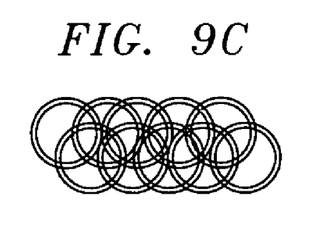
Figure 9D:
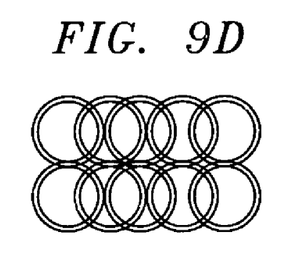
Figure 9E:
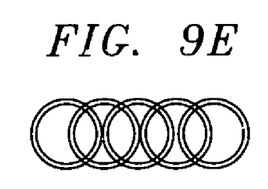
Figure 9F:
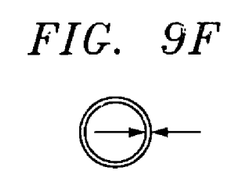
Figure 9G:
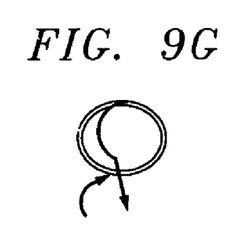

FIGS. 9A through 9G illustrate various implementations using Silicon optical bench (SiOB) techniques of the fixed delay elements 730, 830 of FIGS. 7 and 8. The techniques shown in FIGS. 9A through 9G permit delays on the order of tens of microseconds to be achieved. Generally, the overlapping orthogonal geometries shown in FIGS. 9A through 9G allow several delay lines to be incorporated on a single wafer. FIGS. 9A through 9E illustrates various orthogonal spiral packing on a single wafer. Generally, each configuration provides intersection points that are orthogonal to one another. FIG. 9F illustrates two bounding radii of a spiral delay line, where a smaller radius than the minimum radius is not allowed due to the minimum "bend." FIG. 9G illustrates an exemplary technique for achieving ingress and egress of the optical signals. It is noted that doping materials can be utilized to enhance the index of refraction distances between the waveguide core and the boundary material, thereby reducing the minimum bend geometries that may be established. Additionally, alternative entry/exit methods may be employed using integrated "mirror" structures within the waveguide combined with multiple waveguide layers or novel packaging concepts. Integration of several delay structures within a small area supports the scaling attributes of the OPTR architecture described herein by reducing the number of distinct elements needed for implementation.

Figure 10:
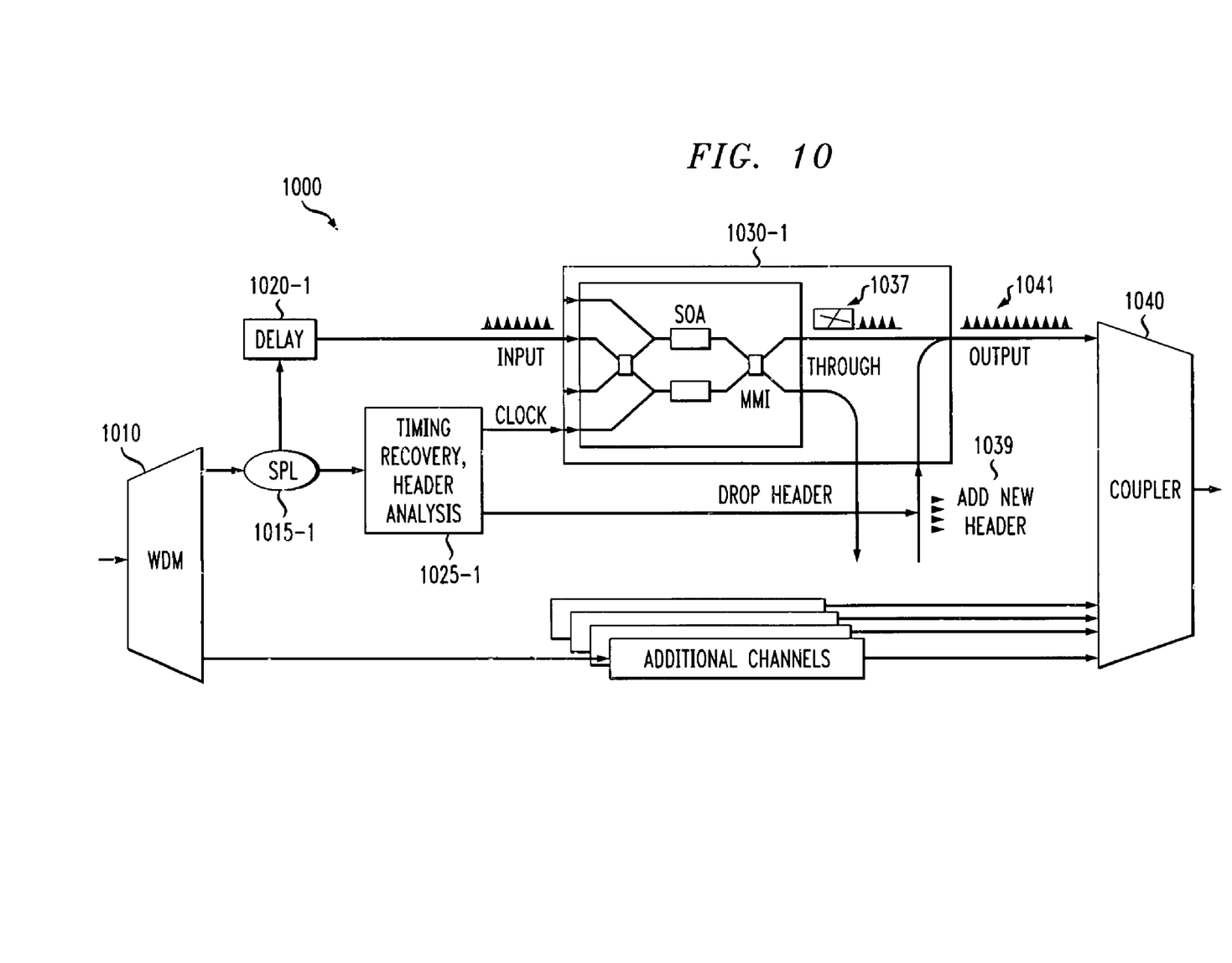
FIG. 10 illustrates a technique for dropping the previous header information and inserting new header information for the next switch or node.

At each routing or switching node within an optical communication system, the header information 110 of a packet tray 100 must be updated to include the routing information for the next node. FIG. 10 illustrates a technique for dropping the previous header information 110 and inserting new header information for the next node. As shown in FIG. 10, a WDM demultiplexer 1010 separates the optical signal into each respective channel. An optical splitter 1015 then divides the optical signal so that the data and control sections can be separately processed. The header information is analyzed at stage 1025 to perform timing recovery, header bit synchronization and header or frame detection. The detected header information 110, together with a routing algorithm and topology information (or analogous information used for cut-through routing techniques), is used to properly configure the router 200, e.g., in order to switch each packet tray 100 to the appropriate output channel, and then to update the header information for the next stage. Each output channel of the router 1000 uses an interferometer device 1030, such as a SOA/I device, to delete the prior information bits 1037 and insert the appropriate header bits 1039 to create the well formed packet tray header 1041 for the next switching or routing node. Finally, the packet trays from each of the channels are then combined in the final wavelength multiplexing stage 1040. This technique is applied within the OPTR architecture described above.

Wavelength Server

Figure 11:
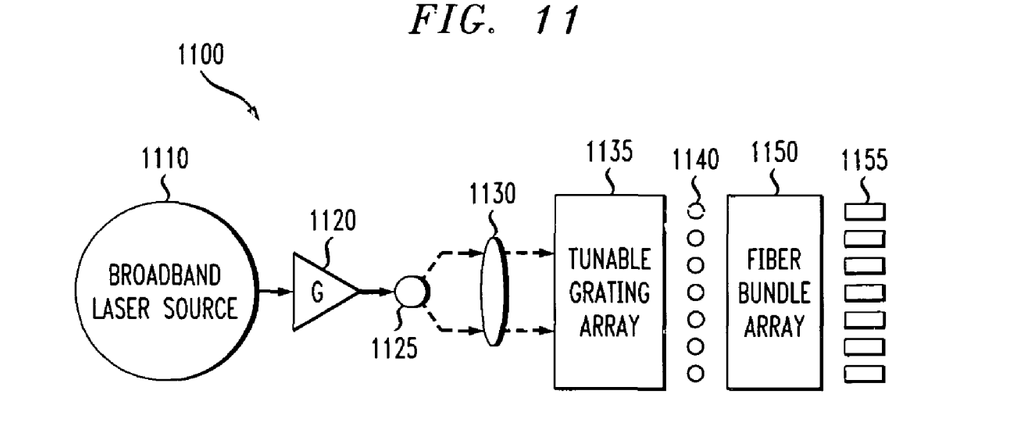
FIG. 11 is a schematic block diagram of one embodiment using traditional optical bench techniques for a wavelength server of FIG. 2.

FIG. 11 is a schematic block diagram of one embodiment of a wavelength server 1100 incorporating features of the present invention. As shown in FIG. 11, a wavelength server 1100 includes a broadband laser source 1110 covering the wavelengths of interest. The generated light is applied to an optical gain stage 1120 in order to increase the power before it is split many times. The amplified light source is then applied to a free space optical system including lenses 1125 and 1130 that spread the wave front spatially and create a parallel wave front that is incident upon a tunable grating array 1135. The tunable grating array 1135 is an electrical grating array control element that provides wavelength selection for each array element. Generally, each element of the tunable grating array 1135 can select light of a desired wavelength. (This may be accomplished by tuning the resonant wavelength of the filter cavity through electrical, or other means.) A set of micro ball lenses 1140 may be used to couple the tunable grating array 1135 to a fiber bundle array 1150 which in turn couples the lights to appropriately lensed ribbon fibers 1155. Direct coupling or expanded beam coupling, as described, may be used.

Figure 12:
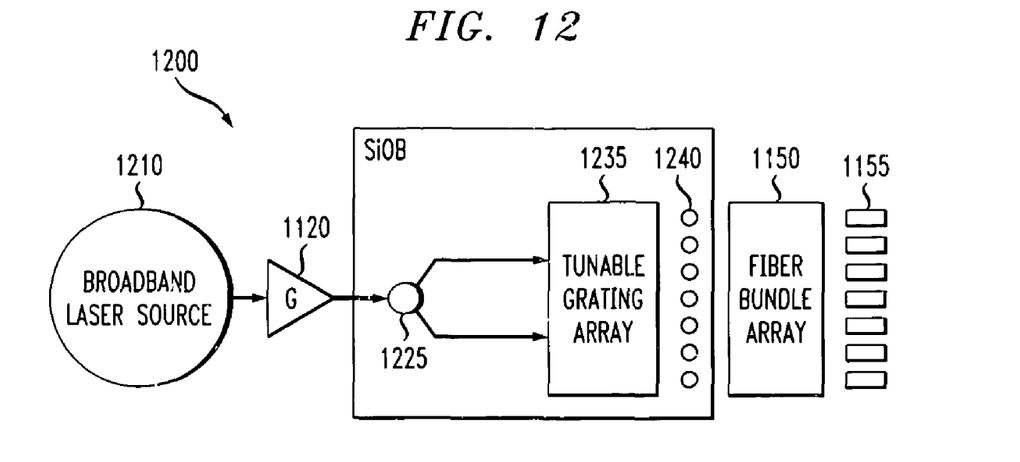
FIG. 12 is a schematic block diagram of an alternate embodiment using integrated electro-optics and silicon optical bench techniques for a wavelength server of FIG. 2.

FIG. 12 is a schematic block diagram of another embodiment of a wavelength server 1200 incorporating features of the present invention. The wavelength server 1200 includes a broadband laser source 1210, optical gain stage 1220, and fiber bundle array 1250 that couples the lights to ribbon fibers 1255 that operate in the same manner as the corresponding elements of FIG. 11, discussed above. While the wavelength server 1100 of FIG. 11 employed free space optical signals, the wavelength server 1200 of FIG. 12 employs optical components in an integrated SiOB device. The silicon optical bench based lens 1225, tunable grating array 1235 and micro ball lenses 1240 operate functionally in the same manner as discussed above in conjunction with FIG. 11.

p-Way Concurrent k-Deep Random Access Write Buffer

Figure 13:
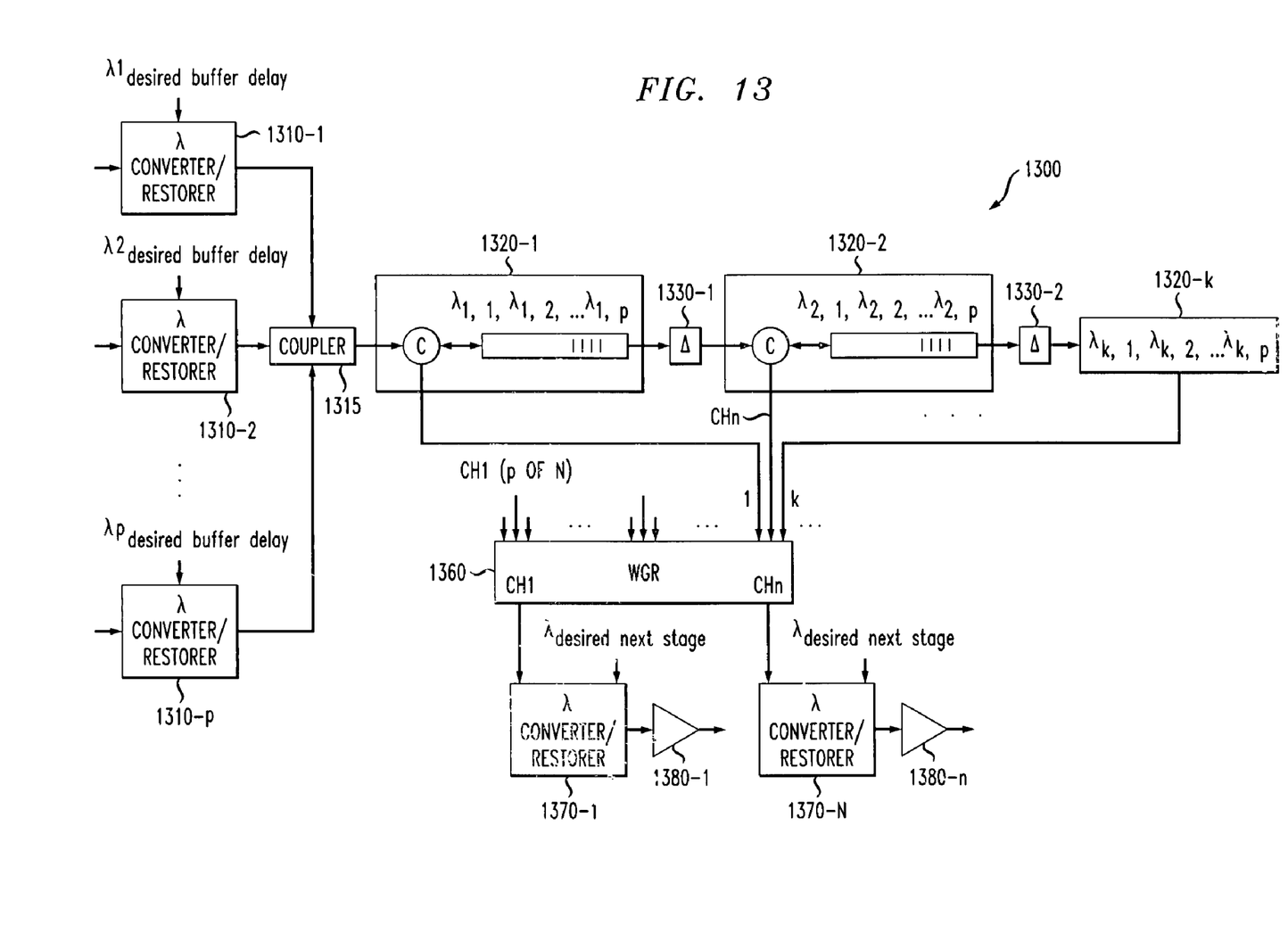
FIG. 13 is a schematic block diagram illustrating another alternate "p-way concurrent", k-deep random access write buffer used by the rescheduler of FIG. 2.

FIG. 13 illustrates an alternate implementation 1300 of the k-deep random access write buffer of FIGS. 7 and 8 that multiplexes p wavelengths concurrently and contemporaneously onto the same structure. While the k-deep random access write buffers of FIGS. 7 and 8 delayed one packet tray by a desired amount, the k-deep random access write buffer 1300 of FIG. 13 delays p signals by a desired amount for each time interval. Each of the k coarse delay elements 1320 contains p resonances to handle up to p groups of wavelengths simultaneously. In other words, each coarse delay element 1320 reflects up to p distinct wavelengths. The corresponding fixed delay elements 1330 may be embodied in the same manner as described above in conjunction with FIG. 7.

The wavelength of a given packet tray is converted by a converter/restorer 1310 to multiplex the packet tray with up to p-I additional packet trays. By appropriate selection of the desired buffer delay wavelengths in the converter/restorer stage 1310, each of the multiplexed packet trays can be delayed by any one of the k possible buffer delay amounts. If a given packet tray is reflected in the first stage, 1320-i, then essentially no delay is introduced to the packet tray 100 (and the tray 100 is not time shifted). The stage that reflects a given packet tray is determined by the wavelength, $\lambda_{desired\ buffer\ delay}$, of the packet tray following conversion by the converter/restorer 1310, in the manner described above in conjunction with FIGS. 6 and 7. The "p-way concurrent," k-deep random access write buffer 1300 can thus process up to p groups of k wavelength signals simultaneously, within a single cascade of "circulator-bragg grating—delay" structures shown in FIG. 13.

As an example of the parameters involved, assume that k, the depth of the re-ordering buffer is four, and the dimension of the WGR is 256×256 ports. Then, each input signal will require four wavelengths to accomplish the desired delay. For this signal, four of the WGR input ports will be required—corresponding to the four possible signal delays. Groups of four input channels to the WGR service a subset of the N×m input packet tray streams. Each of sixty four WGR outputs will contain the appropriately delayed and reordered packet trays. In this introductory example, each Bragg grating is used to reflect a single wavelength, after an appropriate delay, to the WGR-based combining function. Now assume that each grating will reflect p wavelength multiplexed signals, while allowing the others to pass through. By organizing the wavelength mapping performed by the input signal restoration and wavelength conversion functional block to support both the appropriate reordering delay of a given input signal and the reordering delay function across multiple input signals (p), p-wise concurrent operation is achieved. Given that 256 distinct wavelengths may be applied by the up-front wavelength conversion function, 64 input channel groupings, each group of size four wavelengths may be defined.

Wavelengths are distinct and ordered, e.g. sequentially. In this manner, wavelength collisions are avoided within the reordering buffer structure. The first input channel is colored according to the first group of four wavelengths, the second input channel is colored according to the second group of four wavelengths, and so forth. If p is taken to be 64, sixty four signals, wavelength converted (or colored) to one of 256 wavelengths are present in the "circulator-Bragg grating-delay" structure after coupling. Similarly, only four WGR inputs, e.g. the depth of the re-ordering buffer, need be used since these four inputs represent 256 possible colorings. Hence, 64 "circulator-Bragg grating-delay" structures, 256 connections from the appropriate delays to the WGR input ports, and a total of 256 WGR input ports are used when organized in accordance with FIG. 8. The arrangement depicted in FIG. 13 requires a single "circulator-Bragg grating-delay" structure, and four interconnections from the appropriate delays to the WGR input ports, and a total of four WGR input ports. For p equal to 64, a 64-way coupler at the front-end is required to combine the wavelength converted, 64 input signals for presentation to the "circulator-Bragg grating-delay" structure.

Hybrids between FIG. 8 and FIG. 13 are allowed. Implementation details dictate ease of physical instantiation or cost or performance of a given implementation. Through appropriate wavelength selection, full utilization of the WGR ports is achievable. The improved utilization is due to the ability to more fully utilize each WGR input port, allowing a multiplicity (p) of wavelength multiplexed signals on each input port. The input channels for the buffer may be freely chosen from the, already aligned, N×m input channels from the OPTR.

It is noted that the structure in FIGS. 7, 8 and 13 define a full, all optical switch fabric, as well as reordering buffers, in their own right. The output packet trays may be shifted in time, space and wavelength. The OPTR architecture allows scalability through a replication of these optical switches, and their subsequent injection into a fully scalable switch fabric 260.

The k-deep random access write buffer 1300 includes a smaller number of waveguide grating routers (WGR) 1360. The WGR 1360 now receives up to p signals wavelength multiplexed upon a given WGR input channel. Hence, a subset of the input channels of the WGR need now be used. In this manner, approximately N/p input channels of the WGR need only be connected. Given proper selection of the wavelengths, for a fully utilized WGR, all N WGR output channels will receive the appropriate signals. The subset of WGR input channels, each used to carry p wavelength multiplexed signals are wavelength demultiplexed to distinct WGR outputs. As in FIG. 13, adjacent WGR inputs may be associated with the various reordering buffer delay elements, resulting in the combination of these signals on a given WGR output. In this manner, the WGR performs both a summing or combination function as well as a wavelength demultiplexing function. The groups of k signals cover p of the overall N channels at once. It is now possible that more then one signal is active on each of the 1.k inputs to the WGR.

The WGR wavelength steering function will ensure that these signals appear on distinct physical output ports. Proper wavelength selection avoids wavelength and temporal collisions on each of the WGR output ports. The WGR 1360 integrates the k signals for each of the wavelength multiplexed input channels and provides a corresponding output for each of the output channels. The maximum port size of the WGR dictates the reduction in complexity achieved. Hence, if the number of channels that could be processed by a single WGR, is "W," then, the number of WGRs required scales as (N×m)/W. The number of channels that may be processed by each WGR with a given port dimension is a function of buffer depth "k" and the dimension of concurrency, e.g., "p" as described above.

Thus, each of the N×m packet trays can be selectively time shifted by up to k time slots. Thereafter, the wavelength of each packet tray 100 is restored, amplified and converted at conversion stage 1370-$i$ and 1380-$i$ to a new wavelength, $\lambda_{desired\ next\ stage}$, having a wavelength that is appropriate for the next (switching) stage.

Applications

A technique often referred to as wavelength banding has been proposed for future systems. In this paradigm, wavelength spacing on the network connections is not equal, but allocated on a basis of how much bandwidth a signal needs. If the multiplexer, demultiplexer block is replaced by a banded multiplexer/banded demultiplexer block, then the OPTR would work in this context also, since all of the switching, storage, delays, signal restoration (timing)/gain/conversion is of a very broadband nature, hence the switched packet trays could have differing optical wavelength bandwidth requirements. At some point, the very fast signals (today around 40 GHz) start exceeding the ITU defined wavelength spacings, so you could imagine that, for example, a 320 GHz signal would require bandwidth that would span multiple ITU wavelength pickets, that is those pickets would be banded together for transport and switching needs. The disclosed OPTR architecture supports such a wavelength banding implementation.

In another variation, optical time division multiplexed (OTDM) signals can be accommodated within the optical tray router 200 architecture. A demultiplexer would be based upon, for example, a Mach Zehnder interferometer or a similar device providing, techniques to demultiplex very high rate data on a single wavelength. The resulting demultiplexed signals would be presented to the splitter 235 stage. A new functional block would need to be added after the WDM and prior to the Splitter 235 block for this time demultiplexing step. Similarly, prior to the O-Mux block 265, a TDM block would be added. Thus, the same architecture can be applied to time division multiplexed packet trays as well as straight wavelength division multiplexed packet trays.

It is to be understood that the embodiments and variations shown and described herein are merely illustrative of the principles of this invention and that various modifications may be implemented by those skilled in the art without departing from the scope and spirit of the invention.

I claim:

1. A method performed by a router for routing an optical signal, comprising:
   receiving a packet tray including a tray header and a plurality of packets, said packet tray having an associated initial wavelength; and
   adjusting said associated initial wavelength of said packet tray to control the routing of said packet tray based on a label in said tray header of said packet tray through a plurality of stages of said router, wherein said adjusting step further comprises the step of shifting one or more packet trays prior to a switching of said one or more packet trays to avoid a collision on an output channel.

2. The method of claim 1, wherein a payload associated with said packet tray is processed only as an optical signal.

3. The method of claim 1, wherein header information associated with said packet tray is processed as an electrical signal.

4. The method of claim 1, wherein header information associated with said packet tray is processed as an optical signal.

5. The method of claim 1, wherein header information associated with said packet tray is processed as a hybrid of optical and electrical signals.

6. The method of claim 1, further comprising the step of switching said packet tray received on an input channel to an appropriate output channel based on associated header information.

7. The method of claim 1, wherein said packet tray is multiplexed in a wavelength division multiplexed system to transmit said packet tray with a plurality of additional packet trays on a same channel.

8. The method of claim 1, further comprising the step of restoring said packet tray.

9. The method of claim 1, wherein said adjusting step further comprises the step of aligning each packet tray to a master clock-based start of packet tray temporal reference using a tunable optical delay.

10. The method of claim 1, further comprising the step of updating header information of said packet tray to include routing information for a subsequent node.

11. The method of claim 10, wherein said header information is updated in an optical domain.

12. An optical packet tray router, comprising:
    a wavelength demultiplexer for separating a plurality of packet trays received on a same channel, wherein one or more of said packet trays include a plurality of packets;
    a header section for extracting header information from a header portion of each packet tray and for processing said header information associated with each packet tray to route each packet tray to an appropriate destination channel and to make wavelength and timing decisions; and
    a data section for processing said packet trays only in an optical domain, said data section introduces at least one wavelength selective delay to a packet tray based on said timing decisions.

13. The packet tray router of claim 12, wherein said wavelength selective delay is based on a generated optical control wavelength that adjusts a wavelength of a given packet tray.

14. The packet tray router of claim 13, wherein said generated optical control wavelength is generated by a wavelength server.

15. The packet tray router of claim 13, wherein said generated optical control wavelength is applied to a multi-wavelength Bragg grating that shifts temporally a packet tray based on an optical control wavelength assigned to the packet tray.

16. The packet tray router of claim 13, wherein said generated optical control wavelength is applied to a dispersive medium where the transmission time through the dispersive medium is a function of an optical control wavelength assigned to the packet tray.

17. The packet tray router of claim 12, wherein said wavelength demultiplexer is embodied as a banded demultiplexer to permit wavelength banding.

18. The packet tray router of claim 12, wherein said wavelength demultiplexer demultiplexes high rate data on a single wavelength in an OTDM system.

19. A wavelength server that generates a plurality of optical control wavelengths for a plurality of optical switching channels, comprising:
a broadband laser source to generate a laser source signal covering a wavelength range including said plurality of optical control wavelengths;
an optical gain stage for amplifying said laser source signal;
at least one lens that creates a parallel wave front in said laser source signal;
a tunable grating array, wherein each element in said tunable grating array simultaneously generates one of said plurality of optical control wavelengths, wherein said plurality of optical control wavelengths are used by a plurality of optical switching channels; and
a plurality of fibers coupled to said tunable grating array, each of said fibers carrying a corresponding one of said plurality optical control wavelengths.

20. The wavelength server of claim 19, wherein each of said optical control wavelengths adjusts a wavelength of a packet tray to achieve a desired routing of an optical signal.

21. The wavelength server of claim 19, wherein each of said optical control wavelengths adjusts a wavelength of a packet tray to introduce a wavelength selective delay.

22. The wavelength server of claim 19, wherein said at least one lens is fabricated using a traditional optical bench approach.

23. The wavelength server of claim 19, wherein said at least one lens is fabricated using a silicon optical bench approach.

24. The wavelength server of claim 19, further comprising means for coupling said tunable grating array to a fiber bundle array.

25. A method for generating a plurality of optical control wavelengths for a plurality of optical switching channels, comprising:
generating a laser source signal covering a wavelength range including said plurality of optical control wavelengths;
amplifying said laser source signal;
creates a parallel wave front in said laser source signal;
applying said laser source to a tunable grating array, wherein each element in said tunable grating array simultaneously generates one of said plurality of optical control wavelengths, wherein said plurality of optical control wavelengths are used by a plurality of optical switching channels; and
coupling a plurality of fibers coupled to said tunable grating array, each of said fibers carrying a corresponding one of said plurality optical control wavelengths.

26. The method of claim 25, wherein each of said optical control wavelengths adjusts a wavelength of a packet tray to achieve a desired routing of an optical signal.

27. The method of claim 25, wherein each of said optical control wavelengths adjusts a wavelength of a packet tray to introduce a wavelength selective delay.

28. The method of claim 25, wherein said parallel wave is created using at least one lens fabricated using a traditional optical bench approach.

29. The method of claim 25, wherein said parallel wave is created using at least one lens fabricated using a silicon optical bench approach.

30. The method of claim 25, further comprising the step of coupling said tunable grating array to a fiber bundle array.

31. A method for processing an optical signal in a multi-stage network node, comprising:
converting a wavelength of said optical signal to an optical control wavelength appropriate for a current stage using a tunable continuous wave light received over a fiber carrying only said wavelength from a wavelength server that simultaneously generates a plurality of optical control wavelengths for a plurality of optical switching channels;
processing said optical signal in an optical domain using a passive device; and
converting a wavelength of said optical signal to an optical control wavelength appropriate for a subsequent stage using a tunable continuous wave light received from said wavelength server.

32. The method of claim 31, wherein said converting steps further comprise a restoration of said optical signal.

33. The method of claim 31, wherein said processing step implements a switching function.

34. The method of claim 31, wherein said processing step implements an alignment function.

35. The method of claim 31, wherein said processing step implements a multiplexing function.

36. The method of claim 31, wherein said processing step implements a delay function.

37. An optical signal processor in a multi-stage network node, comprising:
a wavelength converter for converting a wavelength of said optical signal to an optical control wavelength appropriate for a current stage using a tunable continuous wave light received over a fiber carrying only said wavelength from a wavelength server that simultaneously generates a plurality of optical control wavelengths for a plurality of optical switching channels;
a passive device for processing said optical signal in an optical domain; and
a wavelength converter for converting a wavelength of said optical signal to an optical control wavelength appropriate for a subsequent stage using a tunable continuous wave light received from said wavelength server.

38. The optical signal processor of claim 37, wherein said wavelength converters are further configured to restore said optical signal.

39. The method of claim 37, wherein said passive device implements a switching function.

40. The method of claim 37, wherein said passive device implements an alignment function.

41. The method of claim 37, wherein said passive device implements a multiplexing function.

42. The method of claim 37, wherein said passive device implements a delay function.

* * * * *